United States Patent
Tukala

[11] Patent Number: 5,865,574
[45] Date of Patent: Feb. 2, 1999

[54] DRILL WITH COOLANT CHANNELS AND METHOD FOR ITS MANUFACTURE

[75] Inventor: Tommy Tukala, Sandviken, Sweden

[73] Assignee: Sandvik AB, Sandviken, Sweden

[21] Appl. No.: 888,051

[22] Filed: Jul. 3, 1997

Related U.S. Application Data

[62] Division of Ser. No. 610,239, Mar. 4, 1996, Pat. No. 5,676,499.

[30] Foreign Application Priority Data

Mar. 2, 1995 [SE] Sweden ..................... 9500755

[51] Int. Cl.$^6$ ..................................... B23B 51/06
[52] U.S. Cl. ..................... 408/57; 408/59; 408/223; 76/108.6
[58] Field of Search ............... 408/57, 59, 223, 408/224; 76/108.6, 108.1, 115

[56] References Cited

U.S. PATENT DOCUMENTS

| | | | |
|---|---|---|---|
| 1,104,989 | 7/1914 | Hanson | 408/59 |
| 1,641,321 | 9/1927 | Cubley | 76/108.1 X |
| 2,148,805 | 2/1939 | Cogsdill | 76/108.1 X |
| 3,364,800 | 1/1968 | Benjamin et al. | 408/59 X |
| 3,504,575 | 4/1970 | Makino et al. | |
| 5,509,761 | 4/1996 | Grossman et al. | 408/59 |
| 5,634,747 | 6/1997 | Tukala et al. | |
| 5,676,499 | 10/1997 | Tukala | 76/108.6 X |

FOREIGN PATENT DOCUMENTS

| | | | |
|---|---|---|---|
| 0 188 035 | 7/1986 | European Pat. Off. | |
| 45006 | 6/1950 | France | 76/108.6 |
| 12 89 386 | 2/1969 | Germany | |
| 28 43 788 | 5/1979 | Germany | |
| 194 706 | 2/1965 | Sweden | |
| 335 111 | 5/1971 | Sweden | |

Primary Examiner—Andrea L. Pitts
Assistant Examiner—Henry W. H. Tsa
Attorney, Agent, or Firm—Burns, Doane, Swecker & Mathis, L.L.P.

[57] ABSTRACT

A spiral drill includes a rear shank portion; a front tip; and a spiral (helical) middle portion extending therebetween. Spiral ribs are formed in the middle portion, and coolant channels extend through the drill to the tip for conducting coolant fluid. The coolant channels form exit openings in the tip which are spaced at different radial distances from a centerline of the drill. Each coolant channel extends spirally through a respective rib, and the portion of each coolant channel disposed in the shank is straight. Those straight portions are spaced by different radial distances from the centerline.

2 Claims, 1 Drawing Sheet

DRILL WITH COOLANT CHANNELS AND METHOD FOR ITS MANUFACTURE

This application is a divisional of application Ser. No. 08/610,239, filed Mar. 4, 1996, now U.S. Pat. No. 5,676,499.

RELATED INVENTION

This invention is related to that disclosed in U.S. application Ser. No. 08/436,214 filed Jul. 5, 1995, now U.S. Pat. No. 5,634,747.

BACKGROUND

The present invention relates to a spiral drill with indexable inserts comprising a holding shank, a nose portion with insert pockets for the receipt of a central insert and a peripheral insert, and a spiral part which comprises two spirally curved ribs with a coolant channel provided in each such rib.

In spiral drills it is possible to supply liquid through coolant channels to openings near the cutting edges, which facilitates chip formation and lowers friction in the flutes. In order not to lower the torsion stiffness and give an undesirable coupling between axial force and torsion angle, the drill can often be made with two spiral coolant channels as shown in the patents SE-335111 and EP-0 188 035, located between the flutes in the ribs where they are least detrimental to the strength of the drill body. Those patents also show how a drill can be made from a such a spiral part joined to a separately made shank part with different locations of coolant channels.

It is also known through Swedish Patent 194706 to make drills with indexable carbide inserts in pockets on a steel body, where it is possible to utilize a limited number of insert sizes for a large number of drill diameters by using two or more asymmetrically located indexable inserts, one of which is a center insert close to the center line of the drill and one of which is a peripheral insert close to the periphery of the drill.

SUMMARY OF THE INVENTION

The invention concerns a spiral drill with coolant channels wherein a larger part of the length of each channel is placed where it detracts as little as possible from the strength and stiffness of the drill, and near the cutting edges the channels are adapted to the location of the inserts.

According to the invention straight main coolant channels are drilled into a cylindrical drill blank from the shank part but not through to the tip end and such that said channels are located at different distances from the center of said blank. The blank is then locally heated and twisted by a predetermined angle. After twisting, the flutes, the insert pockets, the cutting tip and straight exit passage portions are machined into the drill, said exit portions being provided to meet the coolant channels. At least one of the exit portions of the cooling channels can be drilled as a conical channel. During this machining the cooling channels in the shank part are used as an angle reference. The invention makes it possible to locate the exit openings at optimal positions relative to the insert pockets without regard to the spiral channel location in the cross-section.

In accordance with one embodiment of the invention the cooling channels are drilled mutually parallel but located at different radial distances from the central line of the portion of the cylindrical drill blank that is subjected to a twisting after being heated. In accordance with an alternative embodiment the cooling channels are drilled at an oblique angle in relation to the central axis of the drill blank such that they terminate at different distances from the central axis at their exit openings.

The insert pockets are asymmetrically located, one near the center and one near the periphery. In order to achieve the best effect of the coolant, the exit openings should be located at the same position as the following (trailing) insert and thus one exit opening should be located closer to the center and one closer to the periphery, which is accomplished by drilling the exit channels in connection with the machining of the insert pockets.

BRIEF DESCRIPTION OF THE DRAWING

The invention is described in detail with reference to the figures, where.

DETAILED DESCRIPTION OF PREFERRED EMBODIMENTS OF THE INVENTION

Figure 1:
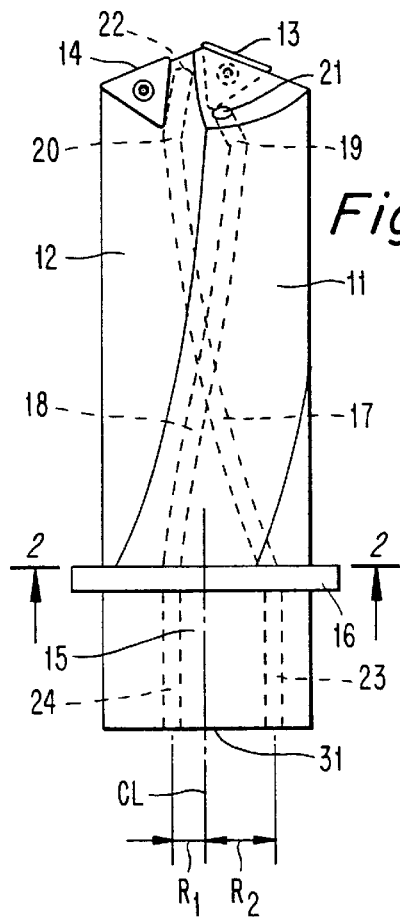
FIG. 1 shows a side view of a drill according to the invention.
Figure 2:
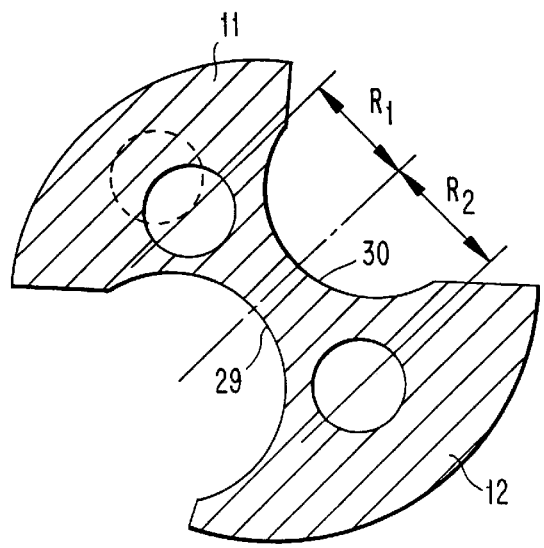
FIG. 2 a cross-section through the drill taken along line 2—2 in FIG. 1.
Figure 3:
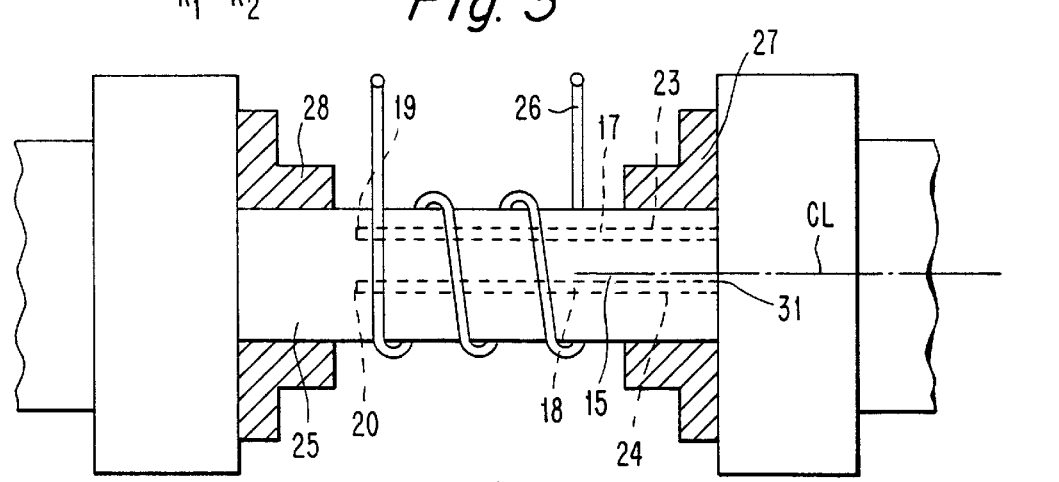
FIG. 3 a drill blank prepared for twisting.

A drill according to the invention comprises a shank part (15), a spiral part with two ribs (11, 12) separated by two flutes (29, 30) and a tip, where one center insert (13) and one peripheral insert (14) are fastened by screws to pockets machined at the ends of the ribs (11, 12). To give the drill a well defined axial position when mounted in a machine, it can be made with a flange (16) between the shank part and the spiral part.

Figure 4:
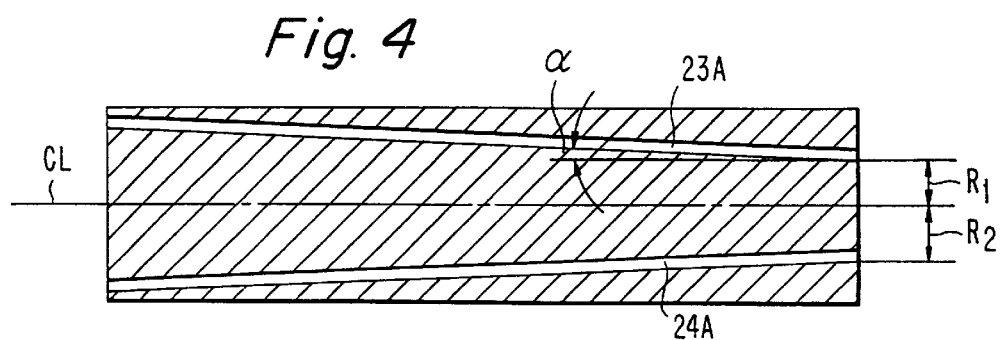
FIG. 4 a longitudinal section of a drill blank, before twisting, according to an alternative embodiment of the invention.

Within each rib (11, 12) there is a coolant channel (17, 18) spirally curved with the same curvature as the rib, and continuing in the shank part (15) as a straight channel (23, 24) extending parallel with the center line while spaced at varying radial distances $R_1$ and $R_2$ from the center line all the way to the end face (21) of the shank part. In accordance with an alternative embodiment (see FIG. 4) these channels (23A, 24A) have a straight extension while diverging towards the drill tip at an angle ($\alpha$) relative to the centerline all the way to the end face (31) of the shank part. The size of said angle ($\alpha$) ought to vary in the range 1.5–4.0° for drills of a diameter between 30–60 mm, and 0.3–2.50 for a diameter between 13–30 mm. That is, the angle ($\alpha$) is in the range of 0.3 to 40 for drills having a diameter of 03 to 60 mm.

The spiral coolant channels (17, 18) end at terminal points (19, 20) within the ribs (11, 12) near the tip. In accordance with one embodiment of the invention conically extending exit channels lead to exit openings (21, 22) in the tip end face behind the inserts. The exit openings are not symmetrically located. Rather, the exit opening (21) on the rib (11) carrying the center insert (13) is located radially farther from the center line than the exit opening (22) to cool and lubricate the following (trailing) peripheral insert (14). Preferably the exit channel in the rib carrying the center insert is made with a larger cross-section than the other exit channel. Alternatively, it could be advantageous in some cases to provide the exit channel on the rib carrying the center insert with a smaller cross-section than the other exit channel.

A drill according to one embodiment of the invention is manufactured from a cylindrical drill blank having two straight parallel axial channels that are to be made into coolant channels (23, 24) disposed at different radial distances from the center line (CL) of the drill blank. The method of manufacture is thereafter the same as already disclosed in copending U.S. application Ser. No. 08/436,214 filed Jul. 5, 1995 (corresponding to Swedish Patent No. 9203716-7), the disclosure of which is incorporated herein by reference.

Briefly, a drill according to the invention is manufactured from a cylindrical drill blank (25). After the channels (23, 24) have been formed in the blank, the blank is mounted in two chucks, one of the chucks (27) holding what is to be the shank part (15) and the other chuck (28) holding a part of the blank near the end that is to become the tip end. The drill blank is heated between the chucks by an induction coil (26) or other suitable means, whereupon the drill blank is twisted a predetermined angle by the chucks. The grip of the chucks must be stable enough to avoid any twisting of those parts of the drill blank held within the chucks. The portions (17, 18) of the channels which are located in a middle portion of the blank between the chucks will become spirally curved, and the position of the terminal points (19, 20) will be well defined relative to the straight channel parts (23, 24), enabling the latter to be used as angle references during subsequent machining of the drill.

After twisting, the drill blank is reduced to its final diameter, and the flutes (29, 30) machined therein. By using the straight portions channels (23, 24) as a reference it is ensured that the spiral flutes will not be located too closely to the cooling channels (17, 18). The pockets for the inserts (13, 14) are then machined, and conically extending exit channels are drilled from the exit openings (21, 22) to the terminal points (19, 20), with the exit openings (21, 22) located at different radial distances from the center line. In accordance with an alternative embodiment, the cooling channels (17, 18) could, for certain drill diameters, be allowed to be terminated directly at the drill tip end portion.

Due to the above outlined arrangement of having the cooling channels located at different radial distances from the center line of the drill blank, it becomes easier to locate the cooling channels and their exit openings such that more space can be provided for the chip flutes (29, 30). This enables greater flexibility (versatility) so as to adapt the location of the holes for various types of chips depending upon the material of the workpieces that are to be the subject of machining. In accordance with one embodiment the size of either of the cooling channels could be larger than the other when there is a need for enlarged coolant supply such as in the proximity of the centrally located insert.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method for the manufacture of a spiral drill with coolant channels and pockets for two indexable inserts, comprising the steps of:

A) drilling in a cylindrical blank two straight holes spaced at different radial distances from a center line of the drill, the holes communicating with a first end face of the cylindrical blank and extending to a second end face of the blank in diverging directions;

B) heating at least a middle portion of the blank;

C) gripping first and second ends of the blank with chuck devices;

D) applying a torque to the chuck devices to twist the middle portion by a predetermined angle to reform the holes into spirally curved channels such that each channel is spaced from a centerline of the drill by a distance which becomes progressively larger toward the second end face; and E) machining spiral flutes, a tip end face, and insert pockets in the blank subsequent to step D, the tip end face being machined in the second end face, and the insert pockets being machined in the tip end face.

2. A spiral drill for indexable inserts, comprising:

a rear shank part defining a rear end;

a front tip with a pocket for a center insert and a pocket for a peripheral insert, the pockets spaced by different respective distances from a centerline of the drill;

a spiral part extending between the shank part and the tip, the spiral part having two spirally curved ribs, each rib having a spiral coolant channel disposed therein;

the spiral coolant channels being spirally curved with the same curvature as the ribs, each channel communicating with the rear end of the drill and extending to the front tip; each spiral channel being spaced from the centerline of the drill by a distance which becomes progressively larger toward the front tip, one of the channels being situated closer to the centerline than the other channel, whereby the one channel intersects the front tip at a location closer to the centerline than the location where the other channel intersects the front tip.

* * * * *